(No Model.)
H. A. GOETZ.
SEED TESTER.
No. 376,242. Patented Jan. 10, 1888.
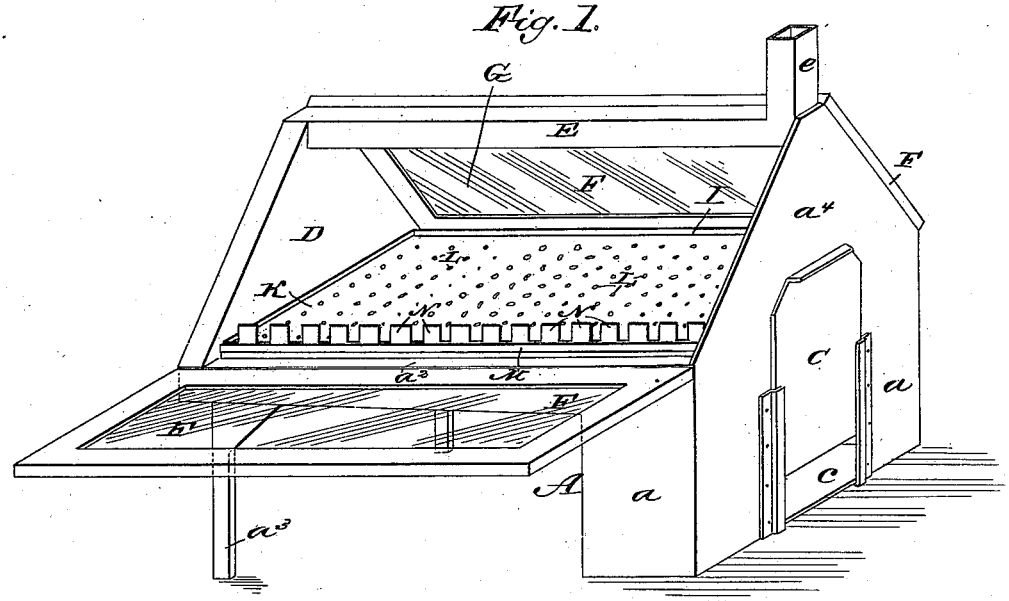
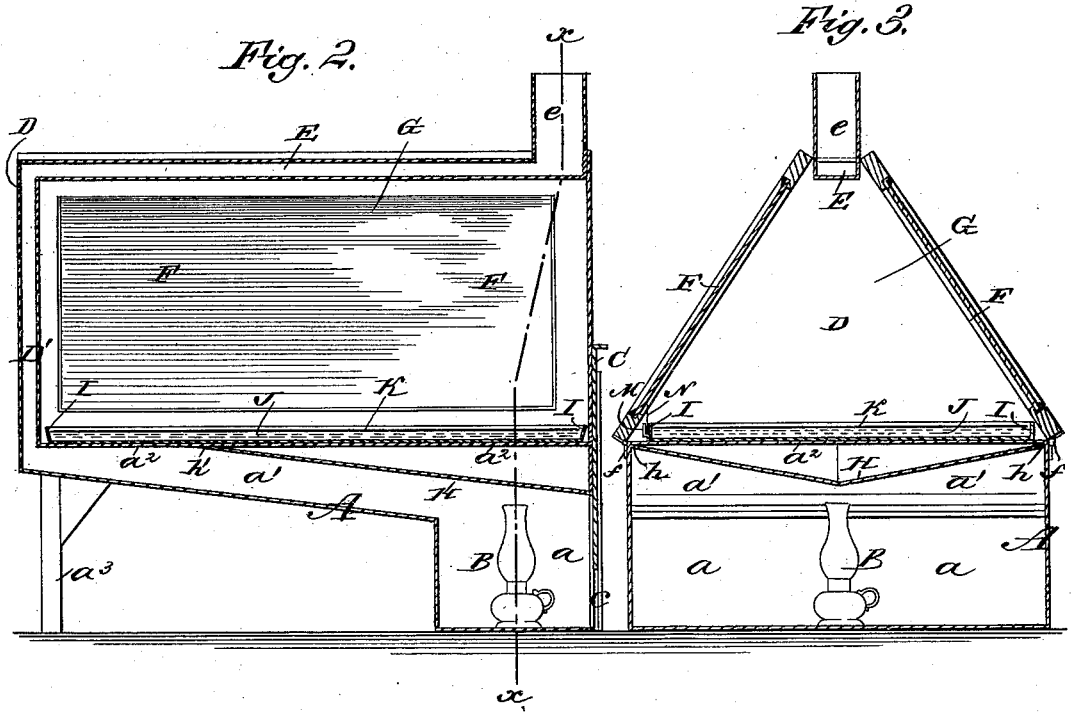
WITNESSES:
Otto Beyer
C. Sedgwick
INVENTOR:
H. A. Goetz
BY Munn & Co.
ATTORNEYS.

UNITED STATES PATENT OFFICE.

HENRY AUGUST GOETZ, OF NEW ALBANY, INDIANA.

SEED-TESTER.

SPECIFICATION forming part of Letters Patent No. 376,242, dated January 10, 1888.

Application filed August 11, 1887. Serial No. 246,679. (No model.)

*To all whom it may concern:*

Be it known that I, HENRY AUGUST GOETZ, of New Albany, in the county of Floyd and State of Indiana, have invented a new and Improved Seed-Tester, of which the following is a full, clear, and exact description.

My invention relates to an apparatus for testing seeds to determine their vitality or germinative qualities, to enable the dealer to give reasonable guarantees of the seed he sells, and to enable the buyer or grower to regulate the quantity of seeds planted to insure a maximum crop on lands under cultivation, and economize time and labor in the work.

The invention consists in certain novel features of construction and combinations of parts of the seed-testing apparatus and in the method of testing the seeds, all as hereinafter fully described and claimed.

Reference is to be had to the accompanying drawings, forming a part of this specification, in which similar letters of reference indicate corresponding parts in all the figures.

Figure 1 is a perspective view of my improved seed tester, with its glazed top partly open. Fig. 2 is a central longitudinal vertical sectional elevation of the apparatus; and Fig. 3 is a vertical transverse section taken on the line $x$ $x$, Fig. 2.

I make the base or lower body portion, A, of the seed-tester with a hollow end part, $a$, forming a chamber in which to place a lamp, B, through an opening, $c$, made, preferably, in the end of the tester, and to which a sliding door, C, is fitted for opening or closing the lamp-chamber, as required, to admit the lamp and give draft. The upper longer portion or flue, $a'$, of the base A extends endwise of the tester from the lamp-chamber $a$, with which it communicates, and the top or roof plate, $a^2$, of the chamber $a$ and flue $a'$ forms a bed plate or floor on which the seeds to be tested are supported, as presently explained. The lamp or heater chamber $a$ forms one end leg of the apparatus, and legs $a^3$, fixed to the bottom of the flue $a'$, support the other end of the tester, as shown in Figs. 1 and 2 of the drawings.

The end D of the apparatus is made hollow, to serve as a flue which communicates with the flue $a'$, and at its central upper part this flue D' communicates with a flue, E, which ranges along the center and top of the apparatus, and at its other end is preferably bent upward, as at $e$, to discharge the products of combustion, which pass from the lamp B into the chamber $a$, and thence along the base-flue $a'$, thence upward through the end flue, D', and thence along the flue E to the outlet at $e$.

The upward extension $a^4$ of the end wall of the lamp-chamber has sloping opposite edges like the upper part of the hollow end wall, D, of the apparatus, whereby glazed frames or doors F F, hinged at $f$ $f$, one at each side of the base A of the apparatus, may be shut upon or against opposite sides of the upper flue, E, as shown in Fig. 3, to form an inclosure, G, which is the seed-sprouting chamber of the tester. I do not limit myself to the precise form shown of this chamber G, as its shape and size may vary with the particular construction of the head part of the apparatus; but the sloping ends of the chamber G and corresponding slope of the opposite doors, F F, allow very convenient inspection of and access to the seeds placed in the chamber, and by arranging the hot-air flue E at the peak or top of the chamber a very long circuit or traverse of the products of combustion from the lamp is assured, and this, in connection with the entire back end, D, of the chamber, being hollow to serve as a hot-air flue and heat-radiator, maintains the air in the chamber G at proper temperature to effectively sprout the good seeds placed in the chamber and without subjecting the seeds to the direct action on them of the heated air, which, if permitted, would injure the seeds.

To promote the more equable distribution of heat from the lamp B throughout the hollow base A and end and top flues, D' E, a deflecting-plate, H, is fixed at the top of the lamp-chamber $a$ and extends from the end of said chamber along some distance into the hot-air flue $a'$. The plate H is bent or concaved downward from its points of attachment at $h$ $h$ to opposite sides of the base A, and at its inner end is attached at $h'$ directly to the floor-plate $a^2$ of the sprouting-chamber G, and whereby the heat from the lamp B will not excessively heat that part of the floor-plate $a^2$ directly over the lamp-chamber and the heat will be diffused more evenly through the hot-air flues of the apparatus.

Upon the floor $a^2$ of the sprouting-chamber

G is placed a shallow tank or pan, I, in which water, J, is placed, and on the surface of the water rests a thin sheet, K, of some suitable porous substance or fabric, preferably cotton or wool, and on this cotton sheet K the seeds L to be tested are laid.

A strip, M, of metal secured at its lower edge and ends to one side of the shallow pan I forms a pocket between said strip and the pan to hold tags or labels N, on which the names of the rows of seeds L will be printed or marked to identify the seeds being tested.

The operation is as follows: The cotton or fibrous material, K, will be laid on the bottom of the pan I, and the seeds L will be laid on it in rows, preferably crosswise, and ten in a row. The labels N will be applied to the pan opposite the rows of seed which they designate, and the pan will be carefully placed on the floor $a^2$ of the sprouting-chamber G. Water, J, will be then poured into the pan at one edge of the cotton, K, so as to float the cotton and the seed placed thereon, and the glazed doors or lids F will be closed to allow heating of the chamber G by the circulation of hot air in the flues $a'$ D' E of the tester effected by the lighted lamp B. The moisture supplied to the seeds by or from the water in the pan I assists the heated air in the chamber in causing the good seeds to sprout, and the seeds may be covered or wetted occasionally by drops of water laid upon them by or from the finger of the operator, and a fertilizer may also be used to hasten their germination. The tester has little or no effect on the poor or worthless seed, which do not sprout well, if at all, hence the vitality or germinative quality of the seeds can be thoroughly tested to assure the buyers of the seeds the exact proportion or amount of seeds to be planted and the largest possible crop from the smallest acreage or extent of land planted, whereby much time and labor will be saved.

It is obvious that the thin sheet K of cotton or fibrous material supports the seeds L on the water J without allowing the seeds to be water-soaked, and yet allowing them sufficient moisture, and the continuous surface of the cotton K allows a large number of the same seeds or different kinds of seeds to be tested at once with economy of time and labor of the operator, the method of supporting the seeds in the hot-air chamber being very simple and effective.

This apparatus is not intended as a substitute for a hot-house bench in which single seeds or a few at a time are supported by small pieces of fibrous material placed on a plate having holes through which the fibrous material takes water from below the perforated plate, but is intended solely as a quick and effective tester of the germinative qualities of seeds without reference to a transplanting of the sprouted seeds. In fact, the roots of the seeds sprouted in the tester become so interlaced or entangled as to render their transplanting impracticable. In results, if five of the ten seeds of each row tested sprout well, the germinative quality of the particular lot of seed from which those tested were taken will average fifty per cent., or there will be fifty per cent. of good seed. If six out of ten seeds sprout well, the result will average sixty per cent. of good seeds, and so on in proportion; hence the buyer may know on what seeds he can rely, and may plant accordingly to insure a good crop, and the seed-seller will be able to give reasonable guarantees of the quality of his goods.

Having thus described my invention, what I claim as new, and desire to secure by Letters Patent, is—

1. In a seed-tester, the combination, with the seed-chamber and its pan, of a lower body portion or base having a heating-chamber, $a$, at one end, a flue, $a'$, leading therefrom along the under side of the seed-chamber and communicating with an outlet, and the deflector H, inclined downwardly in opposite directions from the sides of the heating-chamber to the center thereof, and also inclined from the outer end of the chamber $a$ upward and forward into the flue, whereby the rising heat will be divided and deflected forward and upward, substantially as set forth.

2. In a seed-tester, the combination of a body or base portion, A, having a chamber, $a$, containing a source of heat, and a flue, $a'$, leading from said chamber, and a superposed seed-sprouting chamber, G, having a hollow end wall, D, forming a flue, D', communicating with the base-flue $a'$, a central upper flue, E, leading from the top of flue D' to the other end of the chamber G, and glazed covers or doors, as at F F, closing the space between the upper flue, E, and the base A of the tester, substantially as described, for the purposes set forth.

3. In a seed-tester, the combination of a base, A, having a chamber, $a$, and flue $a'$, a superposed seed-sprouting chamber, G, having a hollow end wall forming a flue, D', communicating with the base-flue $a'$, an upper flue, E, leading from the top of flue D' to the other end of the chamber G, a pan, I, placed on the floor of said chamber, cotton, K, or other fibrous material placed in the pan and adapted to receive the seeds and float them on water in the pan, and hinged glazed doors, as at F, to the sprouting-chamber, all substantially as described, for the purposes set forth.

HENRY AUGUST GOETZ.

Witnesses:
SIMON EPSTEIN,
GEO. P. FEILBACH.